March 7, 1939.  A. F. HICKMAN  2,149,887
DEVICE FOR PROVIDING TORSIONAL RESISTANCE
Filed April 15, 1937  2 Sheets-Sheet 1
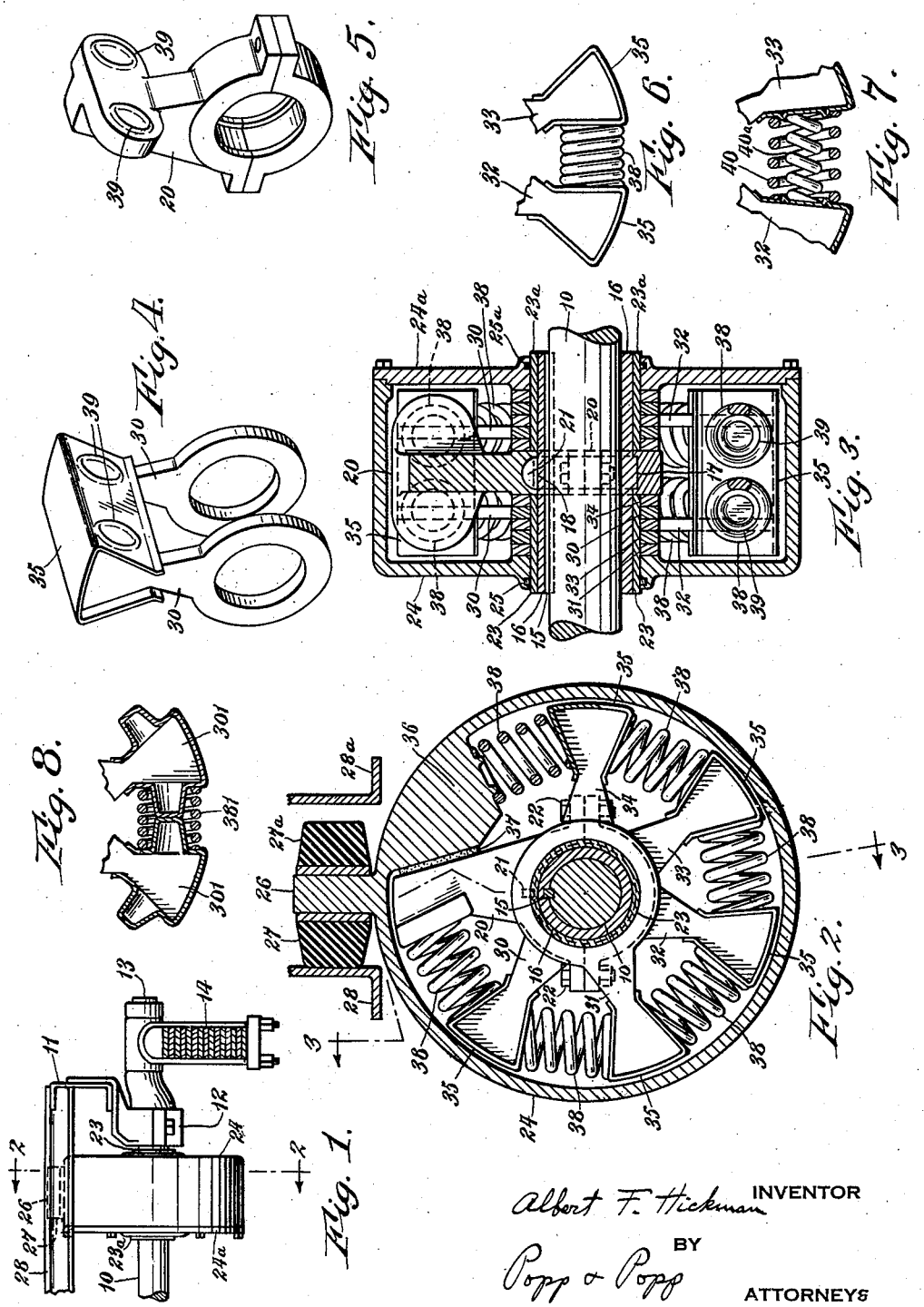
INVENTOR
Albert F. Hickman
BY
Popp & Popp
ATTORNEYS

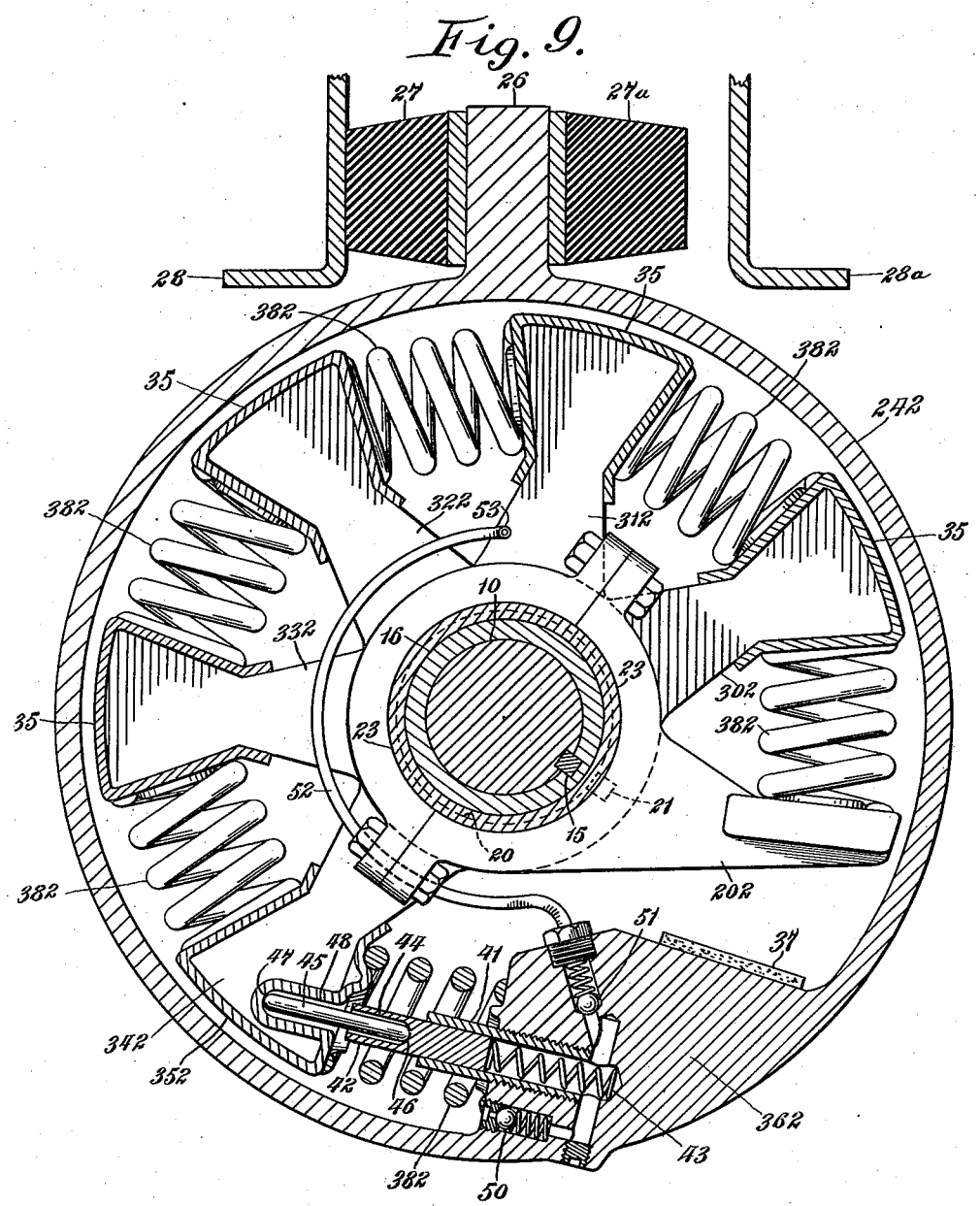

Patented Mar. 7, 1939

2,149,887

UNITED STATES PATENT OFFICE 2,149,887

DEVICE FOR PROVIDING TORSIONAL RESISTANCE

Albert F. Hickman, Eden, N. Y., assignor to Hickman Pneumatic Seat Co. Inc., Eden, N. Y., a corporation of New York Application April 15, 1937, Serial No. 137,099

6 Claims. (Cl. 267—20)

This invention relates to a device for providing resilience, and more particularly a device for providing torsional resilience between two members which are required to rotate a considerable angular distance relatively to each other. The device is intended more particularly for use in that type of vehicle spring suspension in which each end of the axle is connected through linkage, or other movable members, with a rock shaft that is journaled on the vehicle frame and is resiliently restrained against rotation and thereby constitutes a "non-bottoming" resilient connection between the axle and the vehicle frame.

The main object of the invention is to provide a torsional resilience device which is entirely safe in operation and neat and compact in construction and can be so disposed in the spring suspension of a vehicle as to be easily accommodated in vehicle chassis of various constructions.

Another object of the invention is to provide a device of this character which is easily cleaned and will accumulate a minimum amount of caked mud and grease on its outer surfaces when in operation.

Still another object of the invention is to provide a device which is self-lubricating for a period of time equal to the life of the vehicle.

Numerous other collateral objects of the invention and practical solutions thereof are described in the herein patent specification and illustrated in the accompanying drawings, wherein:

Figure 1 illustrates a diminutive, fragmentary, vertical, transverse section, through the rear end of a vehicle showing the device as constructed to be used to resiliently restrain rotation of a cross shaft, which is journaled in the main frame of the vehicle, and having longitudinal leaf springs pivotally arranged at its outer ends to resiliently resist movement of the axle relatively to the frame, similar to the construction shown in Fig. 21 of my co-pending application entitled Vehicle spring suspension, Ser. No. 131,193, filed March 16, 1937.

Fig. 2 is a vertical, transverse section, through the torsional resilience device, taken on line 2—2, Fig. 1.

Fig. 3 is a vertical, longitudinal section thereof, taken on line 3—3, Fig. 2.

Fig. 4 is a detached, perspective view of one of the pairs of transfer arms and their cooperating transfer plate.

Fig. 5 is a detached perspective view of the thrust arm.

Fig. 6 is a fragmentary, transverse section showing how the movement of the transfer arms is limited by the compression spring arranged therebetween.

Fig. 7 is a fragmentary, transverse section, through a torsional resilient device showing a compound spring between a companion pair of transfer arms.

Fig. 8 is a fragmentary, transverse section, through a torsional resilient device, showing a means of limiting the movement of each pair of transfer arms relatively to each other, which is totally independent of the springs which resiliently tend to separate the latter.

Fig. 9 is an enlarged, vertical, transverse section, through a torsional resilient device, similar to that shown in Fig. 2 but illustrating a means whereby the device may be automatically lubricated.

Similar characters of reference indicate like parts in the several figures of the drawings.

The present invention relates to a device for resiliently resisting rotation of a rotary member (such as the crank shaft 10 of Fig. 1) relatively to a stationary member (such as the vehicle frame 11). Such a device has, obviously, very many and various applications, but the present invention concerns itself chiefly with a device of this character as applied to the spring suspension of a vehicle for the purpose of supplying the needed resilience between each end of each axle and the main frame of the vehicle. How this may be carried into practical effect is disclosed in greater detail in my co-pending application for Vehicle spring suspension, Ser. No. 131,193, filed March 16, 1937, and also in my U. S. Patents Nos. 1,892,305, 1,928,651, 1,934,670, 2,012,008, 2,031,482 and 2,068,676 and my patent applications for Vehicle spring suspension, Ser. No. 696,803, filed Nov. 6, 1933; Ser. No. 713,161, filed Feb. 27, 1934; Ser. No. 752,488, filed Nov. 10, 1934; Ser. No. 61,200, filed Jan. 28, 1936; Ser. No. 85,726, filed June 17, 1936.

The present invention may be employed in any of the constructions shown in any of these patents and patent applications, inasmuch as each of said constructions discloses a spring suspension in which a shaft is journaled on the vehicle frame or on a member connected therewith, the rotation of said shaft being resisted resiliently. In the present patent application it is, however, only illustrated as applied to resiliently restraining the rotation of a crank shaft 10 which is arranged transversely of the vehicle frame 11 and is journaled adjacent its opposite ends on said frame in bearings 12. The crank pins 13 at opposite ends of said crank shaft 10 are pivotally arranged in the central part of the semi-elliptic, leaf spring 14, to the outer ends of which the rear, tandem vehicle axles are secured as shown in my co-pending patent application Ser. No. 131,193, previously referred to.

Secured by a key 15 to said cross shaft 10 is a hardened and ground sleeve 16. The central part of said sleeve is provided with an annular locating ridge 17 of rectangular cross section which is cut longitudinally at one point to form a keyway 18. A thrust arm 20 is clamped to the central part of said hardened sleeve 16, the hub of said thrust arm being annularly bored out to embrace or receive the rectangular ridge 17 of said sleeve, thereby preventing longitudinal displacement of said thrust arm relatively to said sleeve. Rotation of said thrust arm relatively to said sleeve is prevented by a Woodruff key 21 which is suitably seated at its curved side in the hub of the thrust arm, and engages on its straight side with aforesaid keyway 18 of the hardened sleeve 16. The thrust arm 20 is enabled to be assembled on the ridge 17 of said hardened sleeve by having its hub diametrically split and clamped together by clamping bolts 22. This arrangement permits the thrust arm 20 to be solidly clamped to said hardened sleeve 16 even though the hole in the hub of said thrust arm is machined considerably different from the diameter of the hardened sleeve.

Push fitted over the opposite ends of the hardened sleeve 16 is a pair of anti-friction bushings 23, 23a and mounted upon said bushings at the outer ends thereof is a casing 24, the cover 24a of which is detachable to permit of assembly. Suitable felt washers 25, 25a may be arranged in the hubs of the casing and the casing cover, respectively, to prevent the leakage of oil, and to keep out dust and dirt.

This casing 24 is held in a substantially stationary position relatively to the main frame 11 of the vehicle. This is effected by providing an upwardly projecting arm 26 at the upper end of the casing, the lateral opposite faces of said arm being preferably provided with rubber bumpers 27, 27a which are located intermediate of a pair of horizontal, transverse bars 28, 28a forming a part of the main frame 11 of the vehicle. It will be noted in Fig. 2 that a certain amount of rotational movement of the casing 24 relatively to the main frame 11 of the vehicle is permitted. The reason for this feature will be described hereinafter.

Arranged within the casing 24 and journaled on the bushings 23, 23a are a plurality of pairs of transfer arms 30, 31, 32, 33 and 34. Each pair of transfer arms is connected at its outer end by a transfer plate 35 which is either welded or otherwise secured at its opposite ends to its companion pair of transfer arms. The inner ends of each pair of transfer arms symmetrically straddle the hub of the thrust arm 20, and each pair of transfer arms is so spaced apart in a direction longitudinal of the crank shaft 10 as to permit all of the pairs to snugly "nest" one within the other as shown in Fig. 3. By this construction the thrust arm 20 is constrained to move with the crank shaft 10, but each one of the pairs of transfer arms 30, 31, 32, 33 and 34 is independently capable of rotating on the bushings 23, 23a. At the same time the hub of the thrust arm 20 is enabled to longitudinally "center" all of the pairs of transfer arms and the casing 24 as well.

Formed on one side of the hollow interior of the casing 24 is an abutment 36 whose counter-clockwise face acts to limit the clockwise rotation of the thrust arm 20 relatively to the casing. This face of the abutment is preferably covered with a rubber pad 37 to prevent noise if and when said thrust arm 20 rotates in a clockwise direction to its limiting position relatively to the casing 24.

Arranged between the thrust arm 20 and the transfer plate 35 of the first pair of transfer arms 30 is a pair of compression springs 38, and a similar pair of compression springs is arranged between the transfer plates 35 of each adjacent pair of transfer arms and also between the transfer plate of the last pair of transfer arms 34 and the abutment 36. Accidental lateral displacement of these springs is prevented by providing suitable pairs of annular ridges 39, as best shown in Figs. 4 and 5.

This arrangement places the pairs of springs 38 in series with each other, and is, in effect, a single long compression spring which is suitably restrained at intervals against lateral deflection and thereby restrained against buckling. It is obvious that tension springs could be used instead of compression springs but the anchorage of tension springs is much more expensive and, besides, there is no problem of buckling in a tension spring and hence a single long tension spring, such as that shown in my Patent No. 1,892,305 may be advantageously employed. It is to be understood, however, that such a long tension spring or a torsion rod type of spring frequently cannot be conveniently placed in a vehicle chassis and even when a place can be found for it, there is still the objection that it forms a large surface to become caked with heavy mud and grease and is usually so located as to not be easily cleaned. Hence, and even though long helical springs and the torsion rod type of springs have proven successful in actual practice, the present invention is better fitted for use in certain specific types of vehicle chassis.

There are a number of other unique features in the present invention.

Let us first consider the friction between the thrust arm 20, the various transfer arms and the bushings 23, 23a assuming a pair of ball or other anti-friction bearings to be disposed between the casing 24 and crank shaft 10. When said thrust arm 20 moves slowly a slight amount, the static friction between the thrust arm 20 and the pairs of transfer arms and the two bushings 23, 23a tends to cause said thrust arm and all of said transfer arms to rotate as a unit with the crank shaft 10 and its bushings 23, 23a, thereby eliminating frictional resistance to this movement. Hence, under these conditions, static friction prevents frictional resistance to movement and allows the crank shaft 10 to freely jiggle back and forth without being impeded by resistance. If, however, the thrust arm 20 moves rapidly and/or moves a considerable distance, this static resistance will be overcome, and the movement will be resisted by frictional resistance in addition to the resilient resistance of the springs. On the return stroke this friction will aid the shock absorbers in damping the normal tendency toward periodic vibration.

It is to be noted that the springs 38 provide an arithmetic resistance up to the point where there is no further movement between the thrust arm 20 and the casing 24. Any further pressures are taken care of by the rubber bumper 27 which, to be effective in this capacity, is necessarily stiffer than the springs 36 taken as a whole, and hence provides a "non-bottoming" or geometric resistance "curve" at the end of the arithmetic resistance "line". A similar geometric resistance is derived from the use of the retractive bumper 27a, but in this particular case there is no resistance at all until said bumper 27a swings over into contact with its companion frame bar 28a. This geometric feature is not of particular importance when the present device is used with my spring suspensions but does have a decided value in other industrial applications, such as when used to cushion sudden changes of torque in a line shaft, or in a shaft supplying power to a cement mixer or to a machine liable to become suddenly jammed, etc.

If any certain pair of compression springs is compressed approximately up to its fatigue limit, it is desirable to make provision that this particular pair be no further stressed. This may be effected by so designing the springs that they "close up", as shown in Fig. 6, when they arrive at the maximum allowable stress. It is sometimes difficult to juggle this limitation factor with other desired spring characteristics and in this event the springs may be constructed as in Fig. 7 in which two or more springs 40, 40a are nested, with either the one or the other "closing up" when the maximum allowable amount of movement has been obtained. This nesting arrangement may also be used for the purpose of obtaining a high degree of resilient resistance in a small volume of space. Still another method of limiting the amount of stress in the springs is shown in Fig. 8, in which case provision is made for mechanically limiting the extent to which the transfer arms 301 can come together without relying in any way upon the springs 361 for the obtaining of this result.

In normal operation the thrust arm 20 never comes in contact with the rubber pad 37, as shown in Fig. 2, but is away from said pad, as shown in Fig. 9. Occasionally, however, a broken shock absorber and/or an unusually violent negative rotation of the crank shaft 10 may cause the thrust arm 20 to retract so far as to come in contact with the rubber pad 37, and tend to turn the whole casing 24 in a clockwise direction, and this might impose excessive strains on the parts if suitable provision is not made to counteract this effect. To avoid any such contingency the cross bars 28, 28a of the main frame of the vehicle are spaced sufficiently far apart to permit the casing 24 to rotate a limited amount in a clockwise direction away from the normal position shown.

In Fig. 9 is shown a modified form of the invention whereby the moving parts are lubricated by the movement of the device itself. In this construction the abutment 362 is located at the bottom of the casing 242 and, in this abutment, on its left side and facing the last pair of transfer arms 342, is screwed a cylinder 41. Slidably arranged in said cylinder is a cylindrical piston 42 which is resiliently urged outwardly by a suitable compression spring 43. The outer end of said piston is bored out to form a rocker recess 44 which loosely receives the front end of a rocker rod 45, said front end of said rocker rod being suitably rounded at 46 to enable said rod to freely push the piston forwardly even though said rod moves to a position which is not in alignment with said piston. This result is effected by smoothly rounding the bottom of the rocker recess 44 so as to allow the rounded front end 46 of the rocker rod 45 to roll on the rounded bottom of the rocker recess to the slight extent necessary when the last pair of transfer arms 342 oscillates back and forth and thereby throws the rocker rod 45 slightly out of alignment relatively to the piston 42. The rear end of said rocker rod 45 is similarly rounded at 47 and is similarly loosely received in a rocker recess 48 suitably formed in the transfer plate 352, the bottom of said recess 48 being rounded, as shown, to allow the rocker rod 45 to roll back and forth to positions slightly out of alignment with the rocker recess 48.

Whenever the vehicle is in motion, a variable torque pressure is imposed by the crank shaft 10 upon the thrust arm 202. This variable pressure is carried through the compression springs 382 to the transfer plate 352 of the last pair of transfer arms 342. The latter, consequently, is caused to move back and forth, relatively to the abutment 362, whenever the vehicle is in motion. Consequently, when, and only when the vehicle is in motion, the piston 42 is caused to reciprocate back and forth an amount approximately proportional to the amount of movement of the crank shaft 10. This movement of the piston 42 causes a flow of lubricating oil, in proportion to the amount of its movement, to those friction parts of the present invention which require it, namely, the friction points resulting from the oscillatory movement of the casing 242, thrust arm 202 and the various transfer arms 302, 312, 322, 332 and 342 about the bushings 23, 23a. This automatic and synchronous lubrication is obtained as follows:

Every time the piston 42 moves rearwardly, it sucks lubricating oil from the bottom of the casing 242 through an intake check valve 50. This oil is then forced, when said piston moves forwardly, through an outlet check valve 51 into an oil conveying pipe 52. The latter is so bent as to clear the staggered transfer arms 342, 332, 322 and 312 and opens at the point 53 directly above the crank shaft 10 and centrally longitudinal of the casing 242. This oil, because of its natural affinity for ferrous metals, distributes itself along all of the members which oscillate on the bushings 23, 23a. It is to be noted that this feeding of lubricating oil to the parts which need lubrication is reliably effected even though the level of oil in the casing 242 is considerably below the bottom of the crank shaft 10, so that any leakage of lubricating oil from said casing past the felt washers 25, 25a is reduced to such an extent that the device as a whole requires no lubrication attention for the entire life of the vehicle.

I claim as my invention:

1. A device for providing torsional resilience and adapted to be interposed between a stationary member and a rotary member and comprising: a casing having an interior abutment and an exterior leg; connecting means between said leg and said stationary member; a thrust arm connected with the rotary member; a transfer arm movably connected with said stationary member; a spring connected with said thrust arm and said transfer arm; and another spring connected with said transfer arm and said abutment.

2. A device for providing torsional resilience and adapted to be interposed between a pair of stationary members and a rotary member and comprising: a casing having an interior abutment and an exterior leg loosely disposed between said stationary members; a transfer arm movably connected with said stationary members; a spring connected with said thrust arm and said transfer arm; and another spring connected with said transfer arm and said abutment.

3. A device for providing torsional resilience and adapted to be interposed between a stationary member and a rotary member and comprising: a casing having an abutment; means for limiting the movement of said casing relatively to said stationary member; a thrust arm connected to said rotary member; a transfer arm arranged in said casing and movable relatively thereto; a spring connected with said thrust arm and said transfer arm; another spring connected with said transfer arm and said abutment; and an oil pump actuated by the movement of said transfer arm relatively to said abutment.

4. A device for providing torsional resilience and adapted to be interposed between a stationary member and a rotary member and comprising: a casing having an abutment; means for limiting the movement of said casing relatively to said stationary member; a thrust arm connected to said rotary member; a transfer arm arranged in said casing and movable relatively thereto; a spring connected with said thrust arm and said transfer arm; another spring connected with said transfer arm and said abutment; a reciprocating oil pump connected with said abutment; and a rocker rod interposed between said pump and said transfer arm.

5. A device for providing torsional resilience and adapted to be interposed between a stationary member and a rotary member and comprising: a casing having an abutment; means for limiting the movement of said casing relatively to said stationary member; a thrust arm connected to said rotary member; a transfer arm arranged in said casing and movable relatively thereto; a spring connected with said thrust arm and said transfer arm; another spring connected with said transfer arm and said abutment; a reciprocating pump connected with said abutment and including a piston having a rocker recess; and a rocker rod received at its one end within said rocker recess and having a rocking connection at its other end with said transfer arm.

6. A device for providing resilience and adapted to be interposed between an active and a passive member and comprising: a spring connected with said active member; another spring connected to said passive member; a movable guiding means connected with the adjacent ends of said springs and arranged to restrain lateral deflection of said springs; and means for limiting the movement of the active member relatively to the guiding means and the movement of the latter relatively to the passive member so that if either spring becomes displaced the action of the rest of the device will not be materially affected.

ALBERT F. HICKMAN.